Figures 6, 7:
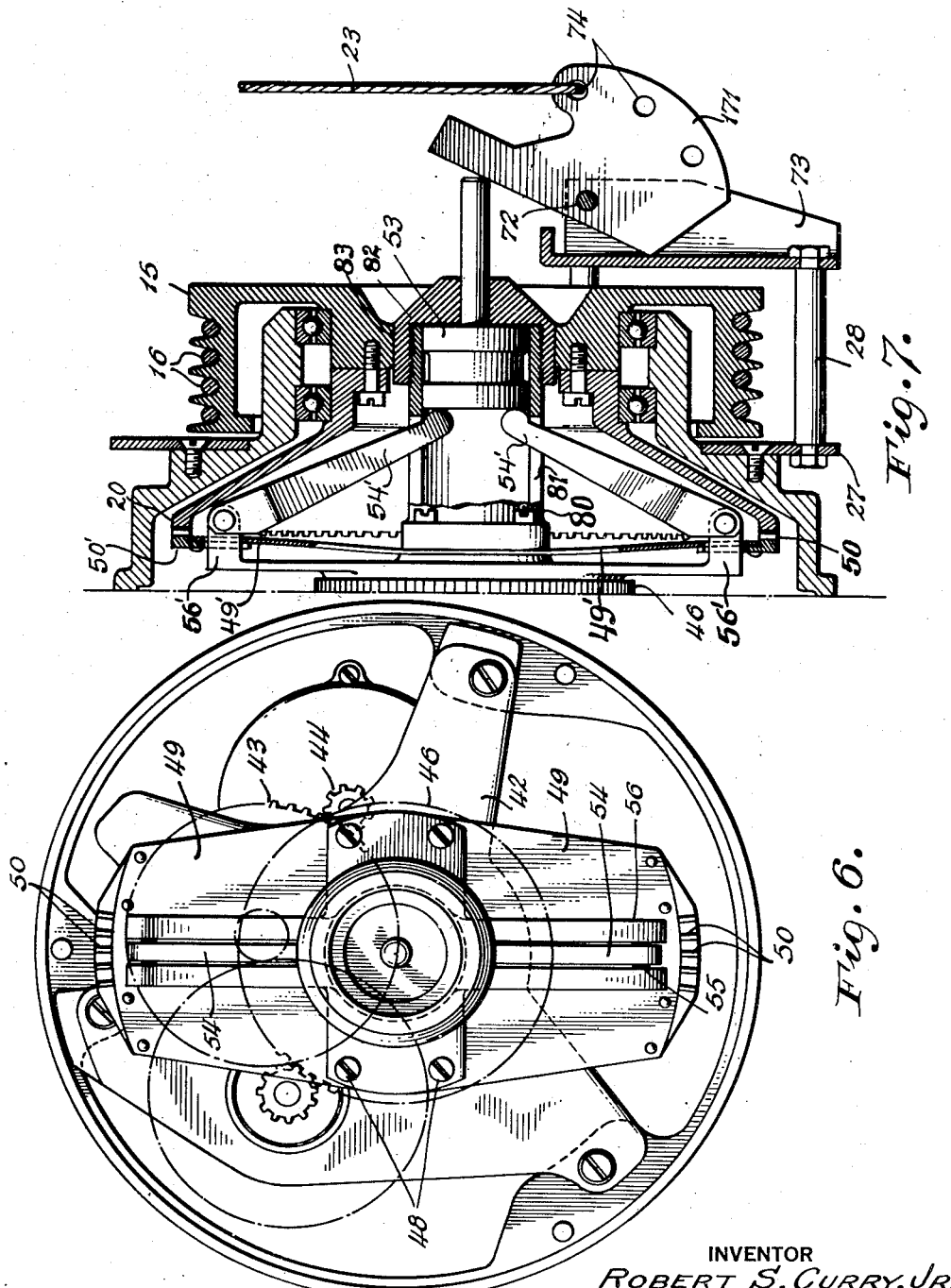

Dec. 26, 1950 R. S. CURRY, JR 2,535,046
SERVOMOTOR
Filed Oct. 25, 1945 4 Sheets-Sheet 1
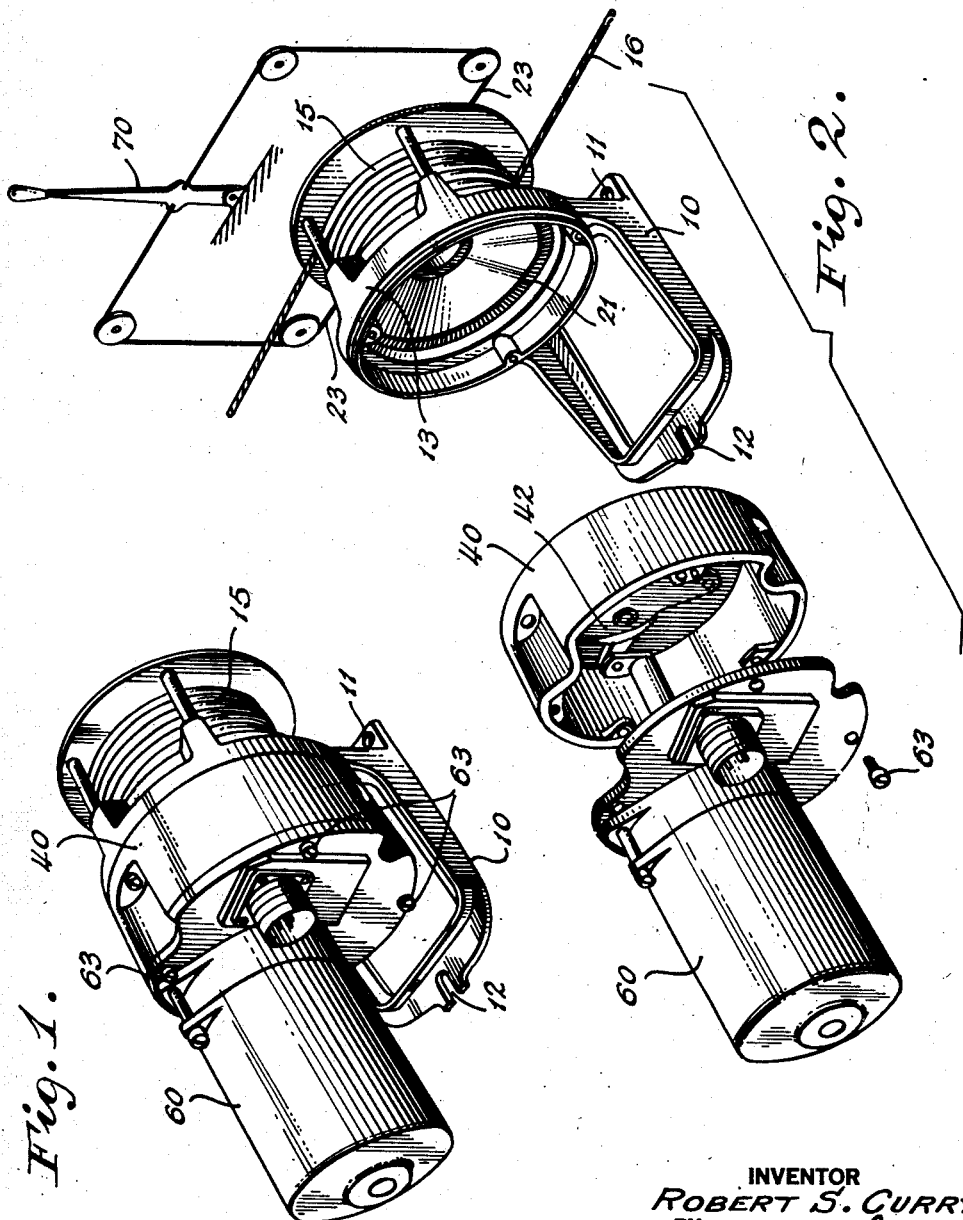
INVENTOR
ROBERT S. CURRY, JR.
BY
Herbert H. Thompson
ATTORNEY.

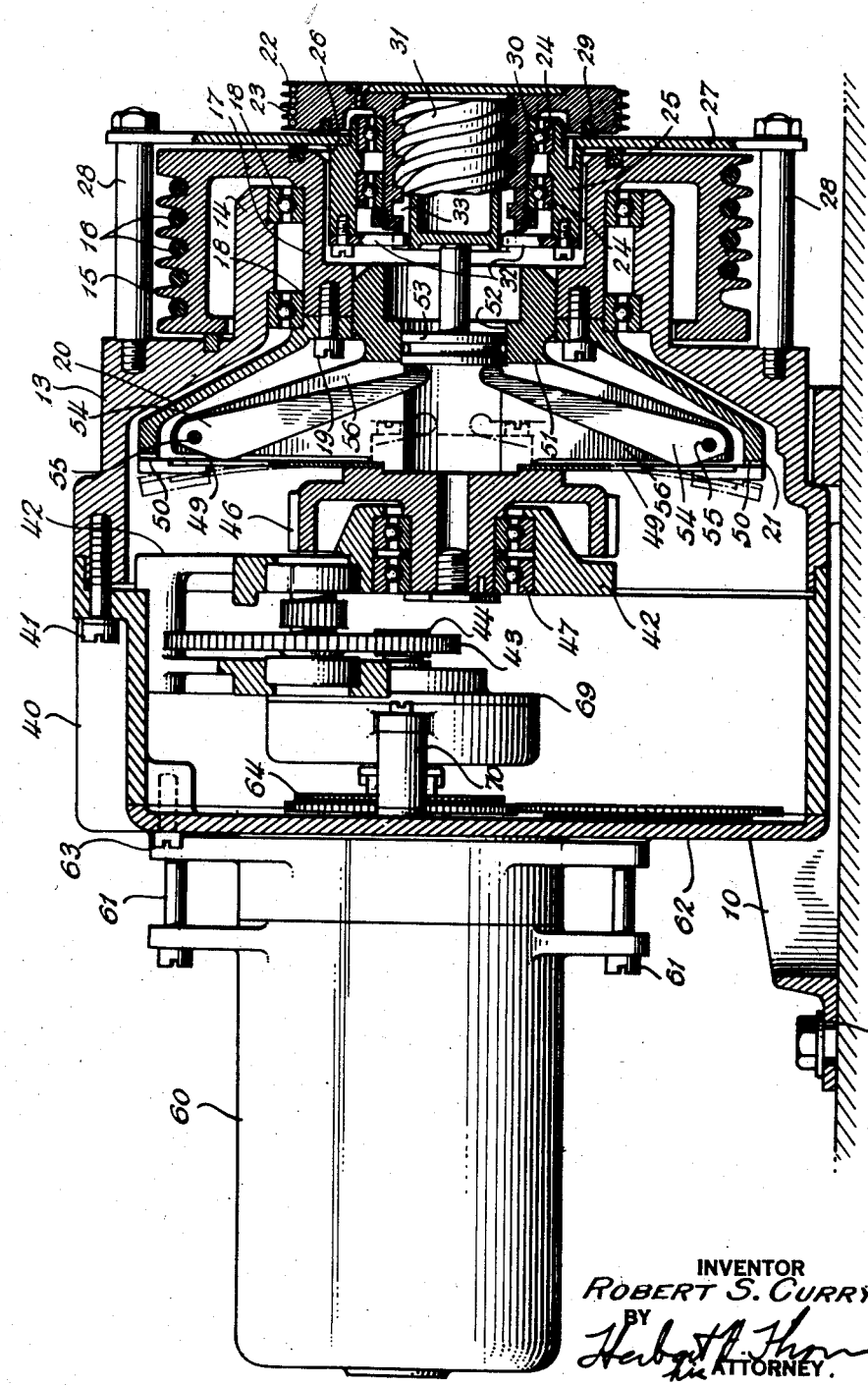

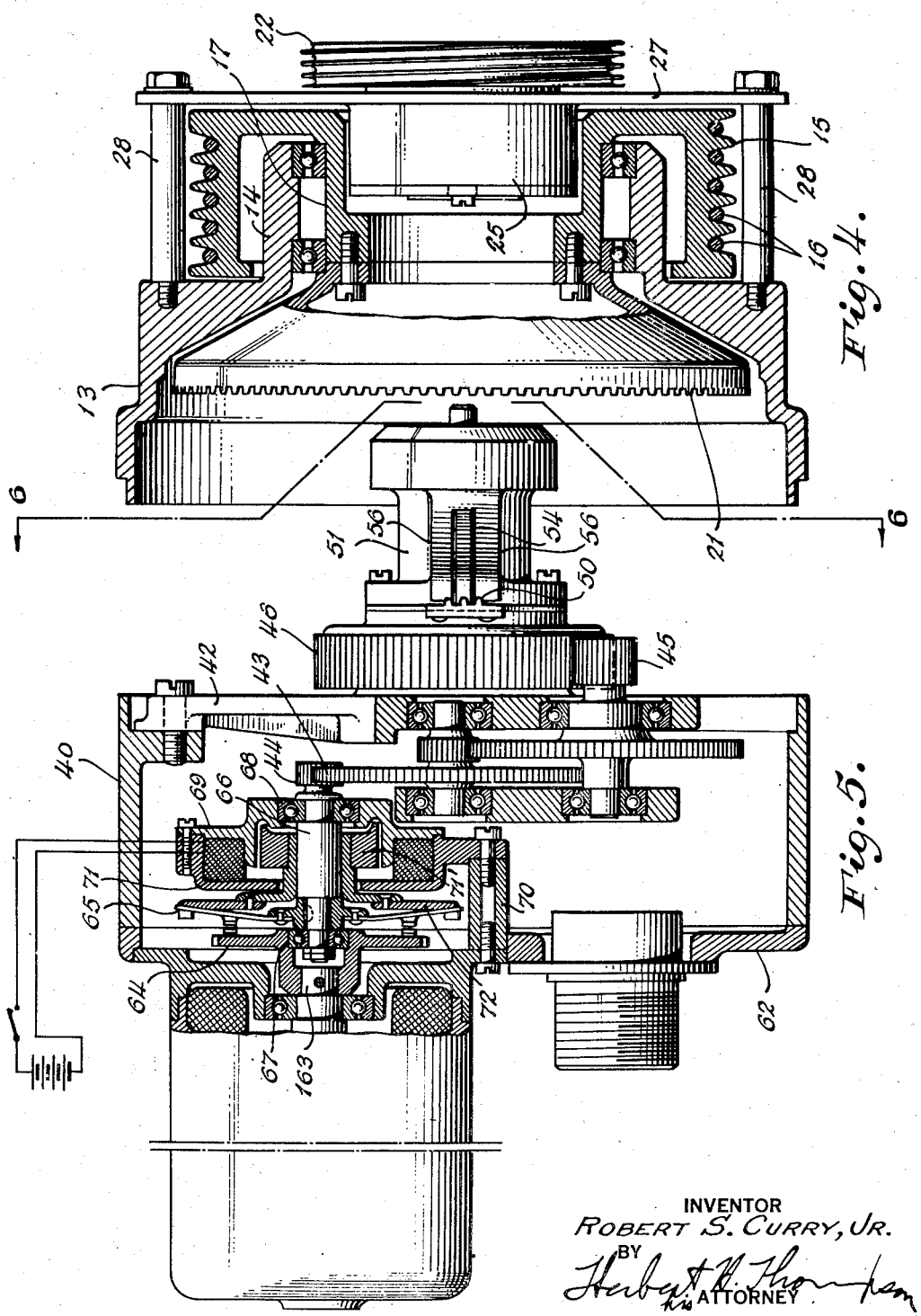

Dec. 26, 1950   R. S. CURRY, JR   2,535,046
SERVOMOTOR
Filed Oct. 25, 1945   4 Sheets-Sheet 4

INVENTOR
ROBERT S. CURRY, JR.
BY
Herbert R. Thompson
ATTORNEY.

Patented Dec. 26, 1950

2,535,046

UNITED STATES PATENT OFFICE 2,535,046

SERVOMOTOR

Robert S. Curry, Jr., Baldwin, N. Y., assignor to The Sperry Corporation, a corporation of Delaware Application October 25, 1945, Serial No. 624,441

10 Claims. (Cl. 192—.02)

This invention relates to servomotors, and more particularly to servomotors for the operation of aircraft control surfaces, characterized by provision of means for simplifying to a high degree the dismounting, overhaul and repair of such apparatus, and is further characterized by provision of clutching and disconnecting means of an exceptionally reliable and rugged nature.

In aircraft gyro pilots one or more gyroscopic controllers are provided adapted through suitable relays and amplifiers to control servomotors which operate the rudder, elevator and ailerons or other control elements in a manner to maintain the aircraft in a predetermined attitude. The servomotor in many cases includes an electric motor and reduction gears driving a cable drum or lever connected to the control element. Servomotors also find use in large aircraft even in the absence of a gyro pilot, where the required control forces are so great as to approach the limit of human strength. The servomotors are there used as part of a manually-governed servo or booster system.

For an aircraft servomotor to be acceptable in practice it must be so designed that the chances of failure are as small as possible, and so that in case of failure of any part of the system the servomotor can be rendered inoperative to control the aircraft. The disengaging means must be very reliable and quick acting because continuance of flight in an incorrect attitude even for a few seconds may be disastrous in some situations. A third requirement is that the servomotor be capable of replacement, repair and overhaul with the minimum of time and complication. Large commercial aircraft, to make expenses have to be kept actually in the air as much as possible, and delays in ground time have serious economic consequences.

According to the present invention a servomotor is provided which meets these requirements to a high degree. The servomotor is made as a plurality of unit sub-assemblies, so arranged that a sub-assembly carrying the control-cable reel or lever can be left permanently attached to the aircraft, and the less rugged gearing and motor assemblies readily detached without disturbing the control cables. This not only reduces to a minimum the amount of handwork that must be carried out within the aircraft; it also does away with the usual necessity for disturbing the control cables. The unit sub-assemblies are so constructed that each affords maximum exposure of the parts therein, for inspection or repair, and further each is readily taken down into the ultimate elements.

Furthermore in the servo of the present invention the main servo disengaging means, disposed between the permanently-fixed unit sub-assembly and the detachable sub-assemblies, is arranged in a manner such that in disengaged position everything possible is disengaged from the control cables, so that any and all jammed or broken parts are cut out of the system.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In the accompanying drawings there is shown more or less diagrammatically two examples of specific embodiments of apparatus within the purview of the invention. In the drawings, Fig. 1 is a perspective view of one form of servomotor in accordance with the invention, Fig. 2 is a similar view but with the several main sub-assembly units shown separated, Fig. 3 is a view in central vertical section of the apparatus of Fig. 1, some parts being shown in elevation, Figs. 4 and 5 are views of the apparatus of Fig. 1 partly in plan and partly in horizontal section, the apparatus being shown partly separated, Fig. 6 is a view front elevation of the motor unit sub-assembly, the apparatus being viewed in the direction of arrows 6—6 in Fig. 5, and Fig. 7 is a view in central vertical section of a modification of the invention utilizing a modified mechanical disengaging means.

Referring to the drawings, the servo of the invention is arranged in three main units or sub-assemblies.

One unit includes a base or bracket 10 having hole and slot means indicated at 11 and 12 for attachment to an aircraft (not shown). The bracket has attached thereto a shell 13 of annular shape, having a projecting tubular spud 14 (Fig. 3). A grooved reel 15 is provided adapted to engage cable 16 leading to control surfaces (not shown). The reel has a reentrant portion 17 rotatably supported within the spud 14 by two spaced ball bearings 18. Attached to portion 17 by screws 19 is a crown gear having a conical web 20 and teeth 21 extending around the periphery (Fig. 4).

The reel and crown gear assembly also has associated therewith means for engaging and disengaging the reel and gear from the drive motor (described hereinafter). Thus, a small reel 22 is provided, adapted to be rotated by a cable 23 leading to a lever 70 in the aircraft cockpit, and having a reentrant sleeve 30 mounted for rotation, in a pair of ball bearings 24, in a spud 25 which is attached as by welding 26 to a plate 27 which is bolted to shell 13 by bolts 28. With the arrangement shown reel 22 is free to be rotated or to remain still independently of the movement of the control cable reel 15. A resilient sealing ring 29 makes a weather-proof joint between reel 22 and plate 27. Sleeve 30 is threaded and engages a screw 31 restrained from rotation relative to plate 27 by means of guide members 32 engaging grooves or ways 33 in the screw as shown. Thus in the apparatus as so far described rotation of clutch operating reel 22 away from the engage position shown causes screw 31 to move out (to the left) which causes disengagement as described below.

The unit sub-assembly described, comprising the bracket 10, shell 13, and the control-cable reel 15 and clutch operating reel 22 and their cooperating parts, ordinarily remains permanently attached to the aircraft, being removed only for major overhaul.

The second unit sub-assembly includes a shell 40 dismountably attached by screws 41 to the shell 13. The shell 40 carries a set of speed-reduction gearing (shown in Figs. 3 and 5) mounted on a spider 42. The high-speed end of the gearing includes a gear 43 adapted to engage the motor pinion 44 (see Fig. 5 described hereinafter) and the low-speed end a pinion 45 (Fig. 5) and a relatively heavy gear 45 mounted in substantial bearings 47 (Fig. 3) and turning at cable drum speed. Gear 46 has attached thereto by screws 48 a springy plate 49 having a few teeth 50 at each end thereof for normal engagement of the teeth of crown gear 20 in the engaged position of the servomotor.

Gear 46 also has attached thereto a spud 51 (Fig. 3) bored at 52 for reception of a sliding plunger 53 adapted to engage a pair of levers 54 pivoted at 55 on wings 56 integral with spud 51 and likewise rotating with gear 46. Levers 54 engage spring plate 49 and are adapted on movement of plunger 53 to the left to disengage the plate from the teeth of crown gear 20. Thus, referring to Fig. 3, the parts appear as shown during engaged position of the servomotor. However, on rotation of the disengage reel 22 plunger 53 is moved to the left, causing disengagement as described. Levers 54 and plate 49 assume the position shown in dotted lines in Fig. 3.

The third unit sub-assembly comprises a motor 60 of electrical or other type, secured by screws 61 to a cover plate 62 which in turn is dismountably attached by three screws 63 (Fig. 1) to shell 40 of the second unit sub-assembly. A clutch is interposed between the motor shaft 163 and the motor pinion 44 (Fig. 5). The clutch includes a toothed member 64 secured to the motor shaft and a springy spider 65 keyed to a shaft 66 which is journaled at one end in bearings 67 in member 64 and at the other end in bearings 68 in a plate 69 which is fixed to cover plate 62 by post 70. A solenoid coil 71 is engaged in cooperating relation with a plunger 71' which is freely mounted on shaft 66 for longitudinal movement therealong. Plunger 71' is fixed to a member 72 which is also freely mounted on shaft 66 and which is adapted, on movement to the left, to engage springy spider 65 with member 64. Thus when the solenoid is energized the motor is engaged to pinion 44.

Upon detaching the three cover plate screws 63 (Fig. 1) the cover plate and motor can be lifted apart from the rest of the apparatus; separation taking place between gear members 43 and 44.

Considering the operations of dismounting the servomotor from the aircraft: the first assembly described, namely that including the bracket, the control-cable reel and the crown gear, as shown at the right in Fig. 2, is normally left permanently attached to the aircraft. These elements are very rugged and ordinarily require detachment only at quite long intervals. By leaving this unit sub-assembly fixed, the considerable advantage is obtained that the aircraft control cables, and likewise the disengage cable, need not be disturbed. The saving in time in overhaul is large because such cables have to be rigged with great care and accuracy, and if disturbed a tedious job may be required to rig them again. Furthermore since they do not even have to be touched during dismounting the danger of injuring a strand by a tool slipping is avoided.

Thus what is taken out of the aircraft consists of the second and third unit sub-assemblies, viz. the gearing and disengage assembly in shell 13 and the motor assembly on plate 62. The combination of the second and third units is removed by unfastening the three screws 41. Removal and replacement is a matter of only a few minutes. The operation will be clear from an inspection of Figs. 4 and 5. Units 13 and 62 can readily be separated merely by removing the three screws 63 (Fig. 2). This leaves the two units with the interiors thereof exposed for maximum accessibility.

Another useful consequency of the arrangement shown is that it is quite possible to provide interchangeable unit subassemblies, having different properties depending on the use desired. For example one aircraft may require a 100:1 gear reduction and another a 200:1 gear reduction. It is a simple matter to provide motor units of various powers, alternating current and direct current, gear-and-disengage units of various ratios, and cable-reel units of various diameters—all readily interchangeable—to accommodate the needs of a wide variety of aircraft.

Considering the functioning of the apparatus during operation of the aircraft; the normal disposition of the parts when the servo system is functioning is with the mechanical clutch (49, 20 in Fig. 3) engaged and the electromagnetic clutch (64, 65, Fig. 5) likewise engaged. The motor 60 thus operates the cable reel in one sense or the other in accordance with signals supplied to the motor in known ways. There are two ways of disengaging the servomotor. One is by pulling cable 23, which as stated ordinarily extends to a lever 70 on or near the instrument panel. This is the most direct possible way of disengaging the servomotor. It will be noted (Fig. 3) that the disengagement operation in effect disconnects as much apparatus as possible from the control cable drum, leaving the minimum possible apparatus to rotate with the cables. This not only makes for safety, by completely declutching all parts which may have jammed or broken, but also makes for reduction of friction because the only load on the manual control system in addition to the load of the control surfaces themselves is that of rotating the control-cable reel.

For the above reasons it is regarded as advantageous in most cases to employ the mechanical clutching means (operated by reel 22) as the sole engaging and disengaging means for the servomotor. Thus in an automatic pilot system, when the pilot is at "off" position, or is at "standby" position (gyros and amplifiers running, but pilot not engaged), the mechanical disengaging lever 70 will be in off position. Engagement of the automatic pilot then involves pulling the lever to "on" position and simultaneously connecting the gyro and amplifier system to the motor 60 in proper fashion.

The other way of engaging and disengaging the servomotor is by means of the electromagnetic clutch 71. Thus in "off" or "standby" position of the automatic pilot clutch 71 is deenergized (disengaged) and on engaging the pilot this clutch is simultaneously engaged. This arrangement has the advantage that the electromagnetic clutch, working as it does at the high speed end of the gearing, can be small and light and readily operable by a small electrical signal. Furthermore, if the electrical supply for the autopilot fails the servomotor is automatically disengaged. Nevertheless the electromagnetic clutch is not an equivalent of the mechanical clutch; it can be used to supplement the mechanical clutch as a refinement if desired.

The mechanical disengaging means described in practice proves to be very rugged and reliable. The clutch operating cable drum 22 can be made as large as needed so as to obtain mechanical advantage to disengage the servo even if congealed grease or ice is present. Furthermore, the whole arrangement is compact, an important point in view of the need for locating aircraft servos in cramped surroundings.

Fig. 7 shows a modified form of mechanical clutch of a simpler construction than that previously described. The main difference is that plunger 53 is actuated by a cam 171 pivoted at 72 to a bracket 73 secured to plate 27 by bolts 28. A set of holes 74 permits the clutch operating cable 23 to be attached to the cam at different angles depending on the positioning of the servomotor in a particular aircraft. Also in this modification, the second part or second subassembly 40 of the servomotor employs a different mounting for the clutch actuating lever fingers and manually operable clutch actuator. As shown a pair of radially extending arms 56' are secured to or integrally formed with the gear 46. At the outer ends of the arms 56' are pivotally mounted a pair of clutch actuating lever fingers 54' which extend radially inward to engage the plunger 53. The plunger 53 is slidably mounted within an extension 80 secured in a suitable manner to the gear 46 and in which slots 81 are provided for receiving the ends of the lever fingers 54'. The gear 46 also carries resilient plate 49' which is slotted at the outer ends thereof to receive the ends of the arms 56'. The resilient plate 49' carries toothed portions 50 which are normally maintained in engagement with the teeth on the crown gear 20 secured to the control element moving drum 15. Upon actuation of the plunger 53 by the cable controlled lever cam 171 the plunger 53 slides inwardly rotating lever fingers 54' about their pivot points on the radial arms 56'. The shoulders of the lever fingers 54' will engage the resilient plate 49' and cause it to be pressed or urged inwardly thereby disengaging the toothed portions 50 from engagement with the crown gear 20. It will be noted that the plunger 53, lever fingers 54', resilient engaging plate 49' and radially extending arms 56' are all mounted on the second unit subassembly 40 of the servomotor. Thus, when the units are disassembled for service these units separate at the clutch junction between crown gear 20 and engaging toothed portions 50, the plunger and end cap 82 sliding out of axial opening 83 in the drum 15.

While the apparatus has been described principally in connection with aircraft control-surface servo systems, where it at present finds its greatest usefulness, the apparatus has advantages in other fields; for example as a marine hoist. Again, while the drive motor has been shown as electrical and the speed-reduction transmission as mechanical in nature, other kinds of drives and transmissions can be substituted and the same advantages realized.

It will be noted that in clutch 64—71 (Fig. 5) the solenoid plunger 71' and disc 72 are freely mounted on shaft 66. The clutch drive is taken solely through spring arms 65. This makes for maximum reliability and certainty of operation of the clutch since the only moving parts that are under load are the spring arms, and such movement is frictionless. Similarly in the mechanical clutches shown the drive load is taken through spring-mounted parts rather than splined parts or the like, insuring very positive and certain engagement and disengagement.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In aircraft servomotor apparatus for the operation of an aircraft control element such as a rudder, a base, means for securing the base to an aircraft, control-element operating means movably mounted on the base, a motor, speed reduction means in driven relation to the motor, clutch means having two substantially completely separable portions one in driven relation to the low-speed end of the reduction means and the other in driving relation to the control-element operating means, means for detachably securing the motor and the first part of the clutch means in driving engagement with the second part of the clutch means, and means constructed and arranged on actuation thereof to operate the clutch means so as to disengage the control-element operating means from the speed reduction means and motor.

2. In aircraft servomotor apparatus for the operation of a movable aircraft control element, a base, means for securing the base to an aircraft, control-element operating means movably mounted on the base, a motor, power transmission means in driven relation to the motor, clutch means having two separable portions one in driven relation with respect to one end of the transmission means and the other in driving relation to the control-element operating means, means for detachably securing the motor and the first part of the clutch means in driving engagement with the second part of the clutch means, and means constructed and arranged on actuation thereof to operate the clutch means whereby to disengage the control-element operating means from the transmission means and motor.

3. In an aircraft servomotor apparatus a first unit sub-assembly comprising a base, means for securing the base to an aircraft and control-element operating means movably mounted on the base; a second unit sub-assembly comprising a support detachably secured to said base and power transmission means carried by the support and having one end of the power transmission means detachably attached to the control-element operating means; a third unit sub-assembly comprising a second support detachably secured relative to the first support and base and a motor secured to said second support and detachably attached to the other end of the power transmission means.

4. In an aircraft servomotor apparatus a first unit sub-assembly comprising a base, means for securing the base to an aircraft, control-element operating means movably mounted on the base and one part of a two-part clutch operatively associated with the control-element operating means; a second unit sub-assembly comprising a support detachably secured to said base, speed-reduction means carried by the support and the other part of the two-part clutch secured at the low-speed end thereof and normally in engaged relationship to the first part; and a third unit sub-assembly comprising a second support detachably secured relative to the first support and base and a motor secured to said second support and detachably attached to the high-speed end of the speed reduction means.

5. In an aircraft servomotor having motor drive means and a rotatable control-element moving means, engaging-disengaging means between the motor drive means and the control-element moving means comprising a clutch having two engageable parts one of which is in fixed relation to the motor drive means and the other of which is in fixed relation to the control-element moving means, a clutch operating member mounted for rotation about the axis of rotation of the control-element moving means, a member operable from the clutch operating member on rotation thereof to move in a direction parallel to said axis of rotation and adapted on such movement to engage and disengage the clutch, and means for rotating the clutch operating member from a point remote from the servomotor.

6. A demountable drive unit for moving an element on a vehicle requiring considerable torque comprising an electric motor, speed reduction gearing operable therefrom and a control-element moving means operable from the speed reduction gearing, a light-weight electrically actuated clutch between the drive motor and the high-speed end of the speed reduction gearing, for routine engagement and disengagement of the motor and a heavy-duty mechanically operated clutch between the low-speed end of the reduction gearing and the control-element moving means, said unit being separatable into a first part including the moving means and one-half of said heavy duty clutch, the second part including the other half of said clutch, said reduction gearing and one-half of said light-weight clutch and the third part comprising said motor and the other half of said clutch.

7. In apparatus of the class described, a clutch comprising a rotatable drive member, an independently rotatable coaxial member adapted to be moved along its axis, resilient means connected to said coaxial member adapted in one position of said coaxial member to operably engage said drive member and in another position of said coaxial member to disengage said drive member, solenoid means comprising a coil member which is stationary, and a plunger member which is mounted on said coaxial member and is constructed and arranged to move said coaxial member axially in response to energization and deenergization of said coil member to thereby engage and disengage said resilient means with said drive means.

8. A clutch mechanism comprising a rotatable control member, a worm gear operably connected to said rotatable member and adapted to move axially in response to the rotation thereof, a rod member adapted to be moved axially by said worm member, a plunger connected to the other end of said rod member from said worm member, a crown gear and resilient engaging means both adapted to rotate about the same axis, a plurality of levers adapted to be actuated by said plunger to thereby engage and disengage said resilient means with said crown gear.

9. A clutch mechanism comprising two sub-assemblies adapted to be easily detached from each other, the first sub-assembly comprising a rotatable control member and a worm gear operably connected to said rotatable member and adapted to move axially in response thereto and the second sub-assembly comprising a rod member adapted to be moved axially by said worm member, a plunger connected to the other end of said rod member from said worm member, a crown gear and resilient engaging means both adapted to rotate about the same axis, a plurality of levers adapted to be actuated by said plunger to thereby engage and disengage said resilient means with said crown gear.

10. A demountable drive unit for moving an element on a vehicle requiring considerable torque comprising an electric motor, speed reduction gearing operable therefrom and a control-element-moving means operable from the speed reduction gearing, a clutch having one member thereof connected in driven relation to the low-speed end of the reduction gearing and the other member thereof connected in driving relation to the control-element-moving means, said unit being separable upon disassembly into a first part including the control-element-moving means and said one clutch member, operatively connected together, and a second part including said other clutch member, said reduction gearing and said motor, all operatively connected together, said one clutch member comprising a crown gear secured to said control-element-moving means and mounted for rotation about an axis in the firrst part of said unit, and said other clutch member comprising toothed members and resilient supports therefor mounted on said second part for rotation about an axis coincident with the axis of said first part when said unit is in assembled condition, said resilient support normally urging said toothed members into engagement with said crown gear, and clutch actuating means comprising a rod and plunger member slidably mounted within said second part for movement along said axis, a plurality of levers pivotally supported on said second part and adapted to be engaged by said plunger and to disengage said toothed members and said crown gear on axial movement of said plunger, and a lever member pivotally mounted on said first part and adapted to engage said rod to effect axial movement thereof.

ROBERT S. CURRY, Jr.

(References on following page)

REFERENCES CITED

The following references are of record in the file of this patent:

UNITED STATES PATENTS

| Number | Name | Date |
|---|---|---|
| 732,943 | Jenatzy | July 7, 1907 |
| 953,118 | Boutell | Mar. 29, 1910 |
| 1,018,891 | Ellett | Feb. 27, 1912 |
| 1,211,747 | Norton | Jan. 9, 1917 |
| 1,215,785 | Ellett | Feb. 13, 1917 |
| 1,268,777 | Willis | June 4, 1918 |
| 1,405,927 | Lauth | Feb. 7, 1922 |
| 2,072,832 | Weydell | Mar. 2, 1937 |
| 2,104,174 | Simmons | Jan. 4, 1938 |
| 2,105,742 | Lee | Jan. 18, 1938 |
| 2,187,835 | Martin | Jan. 23, 1940 |
| 2,265,627 | Caputo | Dec. 9, 1941 |